United States Patent
Casagrande et al.

(10) Patent No.: US 10,742,332 B2
(45) Date of Patent: Aug. 11, 2020

(54) TRANSMITTER-RECEIVER COMPRISING AN ELECTRONIC CHIP

(71) Applicant: The Swatch Group Research and Development Ltd, Marin (CH)

(72) Inventors: Arnaud Casagrande, Bole (CH); Thierry Scordilis, Cormondreche (CH); Luca De Rosa, Colombier (CH); Jean Gorisse, Neuchatel (CH); Jean-Luc Arend, Corcelles (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/658,224

(22) Filed: Oct. 21, 2019

(65) Prior Publication Data

US 2020/0186260 A1 Jun. 11, 2020

(30) Foreign Application Priority Data

Dec. 6, 2018 (EP) .................................... 18210762

(51) Int. Cl.
*H04B 14/06* (2006.01)
*H04B 1/00* (2006.01)
*H04W 88/06* (2009.01)

(52) U.S. Cl.
CPC ............. *H04B 14/06* (2013.01); *H04B 1/005* (2013.01); *H04W 88/06* (2013.01)

(58) Field of Classification Search
CPC ........ H04B 14/06; H04B 1/005; H04W 88/06
(Continued)

(56) References Cited

U.S. PATENT DOCUMENTS

2007/0205865 A1* 9/2007 Rofougaran ............ H04W 4/18
340/10.1
2013/0316648 A1 11/2013 Rofougaran et al.
(Continued)

FOREIGN PATENT DOCUMENTS

EP 3 168 983 A1 5/2017
EP 3168983 * 5/2017
WO WO 2016/022690 A1 2/2016

OTHER PUBLICATIONS

European Search Report dated May 8, 2019 in European Application 18210762.3 filed on Dec. 6, 2018 (with English Translation of Categories of Cited Documents).

*Primary Examiner* — Edward F Urban
*Assistant Examiner* — Angelica M Perez
(74) *Attorney, Agent, or Firm* — Oblon, McClelland, Maier & Neustadt, L.L.P.

(57) ABSTRACT

A transmitter-receiver includes an electronic chip a mixer for mixing the frequency of a received radio frequency signal with that of an oscillating signal supplied by a first frequency synthesizer in, a switch having two inputs connected to an output of the mixer and to an auxiliary input terminal, a filter and gain stage connected to the output of the switch, and a modulator-demodulator connected to the output of the filter and gain stage. The first frequency synthesizer is connected between the output of the modulator-demodulator and radio frequency input and output terminal, and configured to supply a frequency-modulated signal to the radio frequency input and output terminal. The electronic chip further includes a second frequency synthesizer connected between the output of the modulator-demodulator and an auxiliary output terminal, and configured to synthesize a modulated low-frequency signal supplied by the auxiliary output terminal, whereby the center value of the (Continued)

low frequency is equal to the value of the intermediate frequency.

13 Claims, 1 Drawing Sheet

(58) Field of Classification Search
USPC .......................................................... 455/73
See application file for complete search history.

(56) References Cited

U.S. PATENT DOCUMENTS

| | | |
|---|---|---|
| 2014/0150554 A1* | 6/2014 | Rada .................. H04B 1/10 73/592 |
| 2014/0154991 A1 | 6/2014 | Brown et al. |
| 2016/0043762 A1 | 2/2016 | Turnbull et al. |
| 2017/0141857 A1 | 5/2017 | Casagrande |
| 2019/0372219 A1* | 12/2019 | Schneider ............ H01Q 3/24 |

* cited by examiner

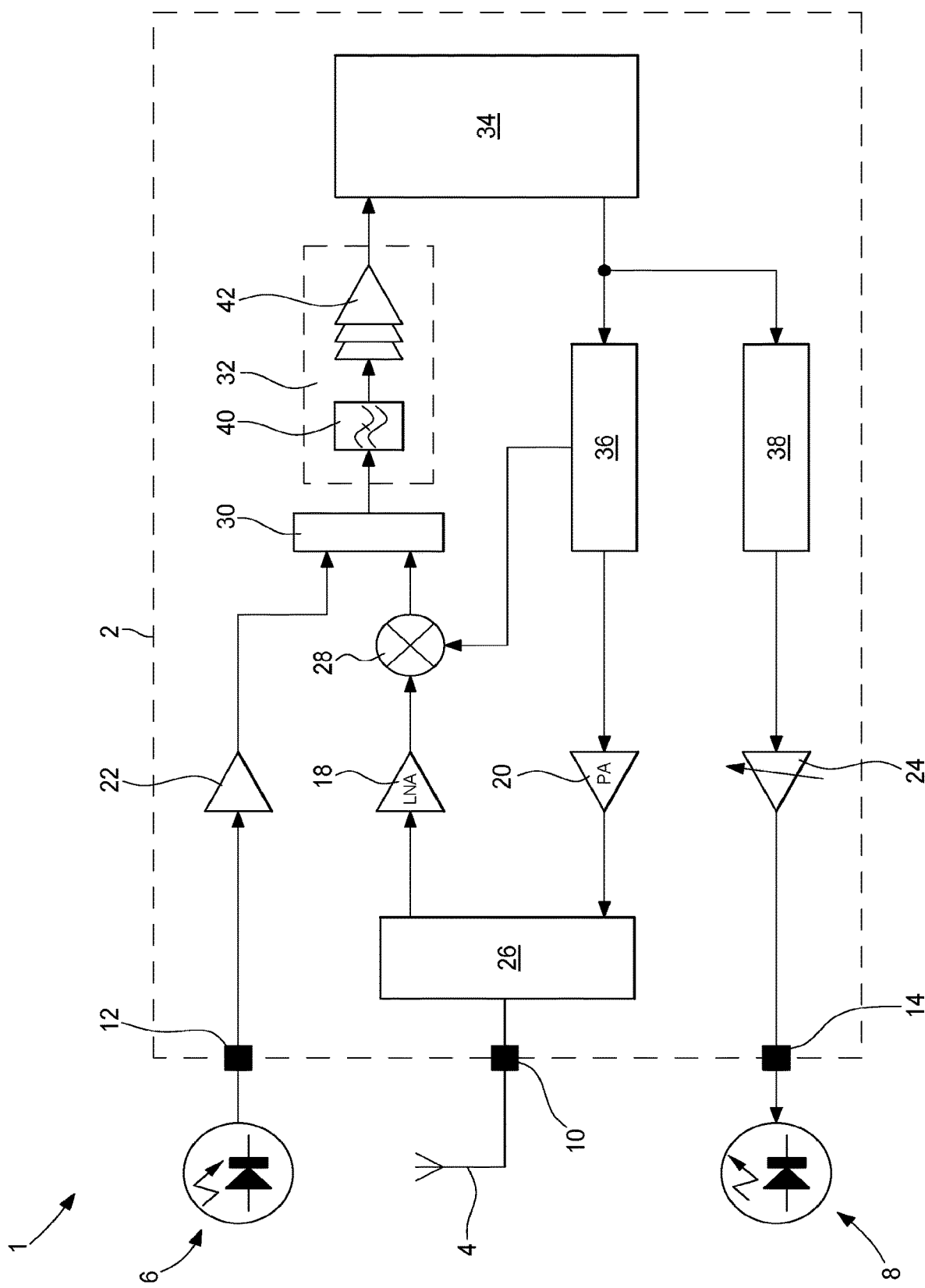

TRANSMITTER-RECEIVER COMPRISING AN ELECTRONIC CHIP

CROSS-REFERENCE TO RELATED APPLICATION

This application claims priority to European Patent Application No. 18210762.3 filed on Dec. 6, 2018, the entire disclosure of which is hereby incorporated herein by reference.

TECHNICAL FIELD OF THE INVENTION

The invention relates to a transmitter-receiver of radio frequency signals and of signals from a frequency domain that is different from the radio frequency domain, such as optical, infrared, sound or ultrasound signals, the transmitter-receiver including an electronic chip.

PRIOR ART

Radio frequency, optical or ultrasonic communication systems or systems using any other transmission medium generally implement only a single communication means for transmitting or receiving data signals. In other words, in such systems, a single transmission medium is generally used by each system.

The design of mobile communication devices is known, which design procures the possibility of receiving radio frequency and/or optical and/or ultrasound signals, in other words which devices are capable of receiving signals originating from at least two different transmission media. However, such mobile communication devices are not capable of sharing the same processing means for processing signals originating from different transmission media. Furthermore, such devices do not allow full-duplex communication to take place in different transmission media in order to additionally be able to transmit other signals if the radio frequency medium is disrupted.

SUMMARY OF THE INVENTION

The purpose of the invention is thus to provide a transmitter-receiver comprising an electronic chip, allowing the same processing means of the chip to be shared in order to process signals originating from different transmission media, while providing the possibility of full-duplex communication in such different transmission media.

For this purpose, the invention relates to a transmitter-receiver comprising an electronic chip, which comprises the features stipulated in the independent claim 1.

Specific embodiments of the transmitter-receiver are defined in the dependent claims 2 to 13.

One advantage of the present invention is that with the proposed arrangement in the transmitter-receiver according to the invention, the same radio frequency receiving channel can be used as that used in a conventional radio frequency signal transmitter-receiver, to demodulate signals from another optical or sound transmission medium.

Moreover, thanks to the presence in the transmitter-receiver of a second frequency synthesiser configured such that it synthesises a modulated low-frequency signal supplied by the auxiliary output terminal, full-duplex communication can take place in different transmission media.

The second frequency synthesiser is typically a low-frequency frequency synthesiser. The centre frequency of the modulated signal supplied by the second frequency synthesiser is equal to the value of the intermediate frequency.

Another advantage of the transmitter-receiver according to the invention is that in the case of a disrupted radio frequency medium, secure, confidential and effective communication can still take place over a different medium from the radio frequency medium. Such a disruption of the radio frequency medium can, for example, be the result of saturation of the WiFi or Bluetooth-type domestic radio frequency networks.

Another advantage of the transmitter-receiver according to the invention is that it allows the carrier thereof to be accurately located, regardless of whether this is a user or an object. This is specifically the result of the properties of certain given transmission media, for example such as the infrared and ultrasound media. This can advantageously be used in applications such as the type for locating people within a room of a building, public and/or urban lighting systems, or even for submerged or surface communication beacons.

Another advantage of the transmitter-receiver according to the invention is that it allows an additional function to be easily added to an existing radio frequency transmitter-receiver, providing beneficial properties thereto, typically directional properties for example ensuring the confidentiality of the transmission. Such an added function consists, for example, of the addition of two infrared diodes, one for the receipt and one for the transmission of an infrared signal.

Another advantage of the arrangement proposed in the transmitter-receiver according to the invention is that it limits the power consumption of the transmitter-receiver, while in particular allowing the radio frequency function to be woken up only upon the detection of signals from another transmission medium. Such a detection can, for example, consist of a detection of low-power infrared signals, or of signals originating from RFID (Radio Frequency Identification) sensors disposed in a sensor network in the vicinity of the transmitter-receiver.

Advantageously, the first frequency synthesiser comprises, for example, an internal sigma-delta modulator, and the second frequency synthesiser can be constituted by a part of this sigma-delta modulator, thus reconfigured as a low-frequency synthesiser. This allows resources already present in the electronic chip to be shared to an even greater extent in order to process radio frequency signals. This saves space and reduces the number of components forming the chip, thus reducing costs.

BRIEF DESCRIPTION OF THE FIGURES

The purposes, advantages and features of the transmitter-receiver will appear more clearly in the following description, which is given on the basis of at least one non-limiting embodiment illustrated in the single accompanying FIGURE, which shows the transmitter-receiver according to one example embodiment of the invention.

DETAILED DESCRIPTION OF THE INVENTION

In the following description, all of the components of the frequency synthesisers, in particular in a transmitter-receiver of radio frequency signals and of signals from a frequency domain that is different from the radio frequency domain, which are well known to a person skilled in the art in this technical field, are only described in a simplified manner.

FIG. 1 shows a general view of a transmitter-receiver 1. The transmitter-receiver 1 comprises an electronic chip 2. In a normal operating mode, the transmitter-receiver 1 further comprises an antenna 4 for transmitting and receiving radio frequency signals at a carrier frequency of about 2.4 GHz, means 6 for receiving an optical, infrared, sound or ultrasound signal, and means 8 for transmitting an optical, infrared, sound or ultrasound signal. In the example embodiment shown in FIG. 1, the receiving means 6 are formed by an infrared diode for receiving an infrared signal, and the transmitting means 8 are formed by an infrared diode for transmitting an infrared signal.

The electronic chip 2 includes a radio frequency input and output terminal 10 connected to the antenna 4, an auxiliary input terminal 12 connected to the receiving means 6, and an auxiliary output terminal 14 connected to the transmitting means 8. The radio frequency input and output terminal 10 is intended to receive and to transmit high-frequency signals. The auxiliary input terminal 12 and the auxiliary output terminal 14 are respectively intended to receive and to transmit low-frequency signals, typically periodic signals of a frequency that is substantially equal to 400 kHz. The electronic chip 2 further includes, preferentially, a receiving low-noise amplifier LNA 18 receiving signals from the antenna 4, a modulated signal output power amplifier PA 20, a receiving low-frequency amplifier 22 receiving signals from the auxiliary input terminal 12, and a programmable supply component 24 supplying a modulated output signal to the auxiliary output terminal 14. Such a modulated output signal is intended for the means 8 for transmitting an optical, infrared, sound or ultrasound signal. The programmable supply component 24 is, for example, a programmable low-frequency amplifier, as shown in FIG. 1. Alternatively, the programmable supply component 24 can be a programmable current or voltage source. The electronic chip 2 further comprises, preferably, an impedance matching transformer 26 connected between the radio frequency input and output terminal 10 on the one hand, and the receiving low-noise amplifier 18 and the power amplifier 20 on the other hand.

The electronic chip 2 further includes a mixer 28, a switch 30 having two inputs, a filter and gain stage 32, a modulator-demodulator 34, a first frequency synthesiser 36 and a second frequency synthesiser 38.

A first input of the mixer 28 is connected to the output of the receiving low-noise amplifier LNA 18. A second input of the mixer 28 is connected to an output of the first frequency synthesiser 36. The mixer 28 is thus intended to mix the frequency of the amplified radio frequency signal received from the receiving amplifier 18, with an oscillating signal supplied by the first frequency synthesiser 36, in order to supply an intermediate periodic signal at an intermediate frequency. The oscillating signal has a frequency, the value whereof is, for example, substantially equal to 2.4 GHz. The intermediate periodic signal supplied at the output of the mixer 28 is a single or quadrature intermediate signal. The intermediate frequency of this intermediate signal is, for example, substantially equal to 400 kHz.

A first input of the switch 30 is connected to the output of the receiving low-frequency amplifier 22. A second input of the switch 30 is connected to the output of the mixer 28. The switch 30 is configured such that it selects one of the two signals present at the inputs thereof and supplies, at the output, the selected signal, intended for the filter and gain stage 32. The intermediate frequency part of the radio frequency circuit can thus be used and the low-frequency signal originating from the auxiliary input terminal 12 can be injected therein, by using the switch 30. Moreover, the arrangement proposed in the transmitter-receiver 1 according to the invention allows the same radio frequency receiving channel to be used to demodulate signals from another transmission medium, while preserving a standard chip size.

The filter and gain stage 32 is connected between the output of the switch 30 and the input of the modulator-demodulator 34. As shown in FIG. 1, the filter and gain stage 32 includes a low-pass filter or band-pass filter 40, and at least one amplifier 42 that amplifies the filtered intermediate signal.

The modulator-demodulator 34 allows the data signals received to be demodulated, and is itself connected to a processing unit not shown in the FIGURE. It should be noted that, in general, the filtered, amplified and demodulated intermediate signals are digitally converted in the processing unit, i.e. sampled while being timed by a clock signal originating from a reference oscillator.

The first frequency synthesiser 36 is connected between the output of the modulator-demodulator 34 and the power amplifier PA 20. As stated hereinabove, another output of the first frequency synthesiser 36 is connected to an input of the mixer 28. The first frequency synthesiser 36 is configured such that it supplies a modulated signal, for example a frequency-modulated signal to the radio frequency input and output terminal 10, via the power amplifier 20. The carrier frequency of such a frequency-modulated signal is, for example, equal to about 2.4 GHz. The first frequency synthesiser 36 typically comprises, for example, an internal sigma-delta modulator, not shown in FIG. 1. The first frequency synthesiser 36 can, for example, be an FSK (Frequency Shift Keying) or GFSK (Gaussian Frequency Shift Keying) two-point frequency modulation synthesiser.

The second frequency synthesiser 38 is connected between the output of the modulator-demodulator 34 and the programmable supply component 24. The second frequency synthesiser 38 is configured such that it supplies a modulated signal, for example a frequency-modulated signal to the programmable supply component 24. The centre frequency of the signal synthesised by the second frequency synthesiser 38 is equal to the intermediate frequency. This frequency (synthesised by the second frequency synthesiser 38) is thus, for example, substantially equal to 400 kHz. The modulated signal supplied by the second frequency synthesiser 38 to the programmable supply component 24 is, for example, frequency-modulated with a deviation of ±50 kHz around 400 kHz.

In one advantageous example embodiment of the invention, the second frequency synthesiser 38 forms a part of the first frequency synthesiser 36 and is configured such that it uses the internal sigma-delta modulator thereof to synthesise the modulated signal.

The second frequency synthesiser 38 is typically a low-frequency frequency synthesiser. The auxiliary output terminal 14, which is a low-frequency signal output terminal, supplies the transmitting means 8 with a modulated low-frequency signal. The transmitting means 8 transmit, upon receipt of this modulated low-frequency signal, an optical, infrared, sound or ultrasound signal.

It is thus understood that, thanks to the transmitter-receiver according to the invention, full-duplex communication can take place in different transmission media in order to additionally be able to transmit other signals if the radio frequency medium is disrupted.

The invention claimed is:

1. A transmitter-receiver comprising an electronic chip, the electronic chip including a radio frequency input and output terminal configured to receive and to transmit a radio frequency signal via an antenna of the transmitter-receiver, an auxiliary input terminal configured to receive a signal originating from an optoelectronic or piezoelectric transducer, and an auxiliary output terminal configured to supply a modulated low-frequency signal to a pressure, sound or optical wave emitting component, the electronic chip further including a mixer for mixing the frequency of a received radio frequency signal with that of an oscillating signal supplied by a first frequency synthesiser in order to supply an intermediate periodic signal at an intermediate frequency, a switch having two inputs connected to an output of the mixer and to the auxiliary input terminal, a filter and gain stage connected to the output of the switch, and a modulator-demodulator connected to the output of the filter and gain stage, the first frequency synthesiser being connected between the output of the modulator-demodulator and the radio frequency input and output terminal, the first frequency synthesiser being configured such that it supplies a frequency-modulated signal to the radio frequency input and output terminal, wherein the electronic chip further includes a second frequency synthesiser connected between the output of the modulator-demodulator and the auxiliary output terminal, the second frequency synthesiser being configured such that it synthesises the modulated low-frequency signal supplied by the auxiliary output terminal, the center value of said low frequency being equal to the value of the intermediate frequency.

2. The transmitter-receiver according to claim 1, wherein the electronic chip further comprises a programmable supply component connected between the output of the second frequency synthesiser and the auxiliary output terminal.

3. The transmitter-receiver according to claim 2, wherein the programmable supply component is a programmable low-frequency amplifier or a programmable current or voltage source.

4. The transmitter-receiver according to claim 2, wherein the second frequency synthesiser is further configured to modulate the signal supplied to the programmable supply component.

5. The transmitter-receiver according to claim 4, wherein said modulation is a frequency or phase modulation.

6. The transmitter-receiver according to claim 2, further comprising an infrared diode or optical diode, or a transmitter for transmitting a sound or ultrasound signal connected to the auxiliary output terminal of the electronic chip.

7. The transmitter-receiver according to claim 1, further comprising an infrared diode or optical diode, or a piezoelectric transducer connected to the auxiliary input terminal of the electronic chip.

8. The transmitter-receiver according to claim 1, further comprising an antenna for transmitting and for receiving radio frequency signals, connected to the radio frequency input and output terminal of the electronic chip.

9. The transmitter-receiver according to claim 1, wherein the filter and gain stage comprises a low-pass filter or band-pass filter, and at least one amplifier for amplifying the filtered intermediate signal, connected at the output of the filter.

10. The transmitter-receiver according to claim 1, wherein the first frequency synthesiser comprises an internal sigma-delta modulator, and wherein the second frequency synthesiser forms a part of the first frequency synthesiser and is configured to use said internal sigma-delta modulator to synthesise the modulated signal supplied by the auxiliary output terminal.

11. The transmitter receiver according to claim 1, wherein the electronic chip further comprises a receiving low-noise amplifier connected between the radio frequency input and output terminal and an input of the mixer.

12. The transmitter-receiver according to claim 1, wherein the electronic chip further comprises a power amplifier connected between the output of the first frequency synthesiser and the radio frequency input and output terminal.

13. The transmitter-receiver according to claim 1, wherein the electronic chip further comprises a receiving low-frequency amplifier connected between the auxiliary input terminal and an input of the switch.

* * * * *